（12）United States Patent
Kulikov

(10) Patent No.: US 12,118,692 B2
(45) Date of Patent: Oct. 15, 2024

(54) IMAGE SUPER-RESOLUTION

(71) Applicant: PICSART, INC., San Francisco, CA (US)

(72) Inventor: Victor Kulikov, Moscow (RU)

(73) Assignee: Picsart, Inc., Hallandale Beach, FL (US)

( * ) Notice: Subject to any disclaimer, the term of this patent is extended or adjusted under 35 U.S.C. 154(b) by 313 days.

(21) Appl. No.: 17/544,981

(22) Filed: Dec. 8, 2021

(65) Prior Publication Data

US 2022/0198610 A1  Jun. 23, 2022

(30) Foreign Application Priority Data

Dec. 17, 2020  (RU) .................. 2020141817

(51) Int. Cl.
| | |
|---|---|
| *G06N 3/045* | (2023.01) |
| *G06N 3/08* | (2023.01) |
| *G06T 3/4007* | (2024.01) |
| *G06T 3/4046* | (2024.01) |
| *G06T 3/4053* | (2024.01) |

(52) U.S. Cl.
CPC .......... *G06T 3/4053* (2013.01); *G06N 3/045* (2023.01); *G06N 3/08* (2013.01); *G06T 3/4007* (2013.01); *G06T 3/4046* (2013.01)

(58) Field of Classification Search
CPC .................................................. G06T 3/4053
See application file for complete search history.

(56) References Cited

U.S. PATENT DOCUMENTS

| | | | | |
|---|---|---|---|---|
| 11,544,816 | B2* | 1/2023 | Kim | G06Q 30/08 |
| 2006/0088207 | A1* | 4/2006 | Schneiderman | G06F 18/24155 |
| | | | | 382/228 |
| 2007/0053513 | A1* | 3/2007 | Hoffberg | G06V 40/103 |
| | | | | 380/201 |
| 2020/0250794 | A1* | 8/2020 | Zimmer | G06T 3/4069 |
| 2021/0004935 | A1* | 1/2021 | Yao | G06T 3/4084 |
| 2021/0076066 | A1* | 3/2021 | Cho | G06T 3/4046 |
| 2021/0390696 | A1* | 12/2021 | Iwase | G06T 5/60 |
| 2023/0186430 | A1* | 6/2023 | Perry | G06T 3/4076 |
| | | | | 382/299 |

OTHER PUBLICATIONS

Dong et al (NPL "Image Super-Resolution Using Deep Convolutional Network", IEEE, 2015) (Year: 2015).*

\* cited by examiner

*Primary Examiner* — Oneal R Mistry
(74) *Attorney, Agent, or Firm* — ARLUYS IP, P.C.

(57) ABSTRACT

Techniques are described for upscaling low-resolution image data. In an embodiment, input image data of a low-resolution image is received to generate output image data for a high-resolution image of the low-resolution image. The input image data is interpolated to match the output size, and, based on the original input image data, the residual image data is determined. The interpolated image data is combined with the residual image data to generate the output image data for the high-resolution image of the output size. The techniques further include training one or more learning models for determining the residual image data based on the original input image data.

20 Claims, 8 Drawing Sheets

IMAGE SUPER-RESOLUTION

BENEFIT CLAIM

This application claims the benefit under 35 U.S.C. § 119(b) as a US national application of the Russian Federation application, RU2020141817, filed on Dec. 17, 2020, the entire contents of which are hereby incorporated by reference for all purposes as if fully set forth herein.

FIELD OF THE TECHNOLOGY

The present invention relates to the field of electronic image processing, in particular to image super-resolution.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

With the proliferation of image capturing devices and their integration into other systems such as mobile phones, the number of images that are captured and stored has grown exponentially to thousands and even millions of images per device. Such amounts of images complicate their storage both locally and remotely. Even with advances in storage technology, images and video/audio capture remain the most taxing digital data. It is not uncommon for users to reach GB's of local storage limits due to image data. Similarly, as users accumulate a lifetime of image data, even the TB's of the remote cloud storage reaches the storage limits under the casual usage of mobile phones and other image capturing devices.

To alleviate the problem, a great number of compression algorithms exist to store encoded image data efficiently and to decompress the image data on the replay. LZW, JPEG, RLE, among others, achieve a significant magnitude of compression compared to the raw image data. However, even using such algorithms, a typical image with sufficient image data for a regular photo print still has a file size of several MBs. Additionally, the compression algorithms may lose vital data necessary to output an image of the full visual quality, thus effectively causing a downscaling of the image.

A similar approach to the compression is the reduction of the image size, actual downscaling of images, which reduces the image storage requirement proportional to the reduction in size. Particularly, the images that are viewed on digital displays, due to the constraints of the display resolution itself, do not require the high resolution necessary for images that are for print. However, once downscaled, similar to the compression, the additional information within the image data is lost. Thus, if the downscaled image is later printed, the print has low quality.

The upscaling is necessary not only to solve storage issues but also to address the shortcomings of the image capture devices. For example, even a camera that may have 10's of MP resolution may capture sufficient details in a general setting. However, if such a camera is used to capture images from a long distance, further upscaling may be necessary to ensure the images include sufficient useful information.

Accordingly, new methodologies are necessary to upscale low-resolution images to achieve the information content of the high-resolution image without taxing storage and/or requiring sophisticated image capture devices.

Those skilled in the art are aware that to increase the resolution of the image without losing its basic content and fine details, it is not enough to simply upscale the image to have a desired larger number of pixels. In this case, the upscaled image will contain both pixels that carry original information on the image and previously non-existent, "empty" pixels for which information needs to be generated. Therefore, the reconstruction of the high-res image from the low-res image includes the upscaling of the low-res image and the clarification/sharpening of the upscaled image.

BRIEF DESCRIPTION OF THE DRAWINGS

In the drawings of certain embodiments in which like reference numerals refer to corresponding parts throughout the figures.

DETAILED DESCRIPTION

Figures 1A, 1B, 1C:
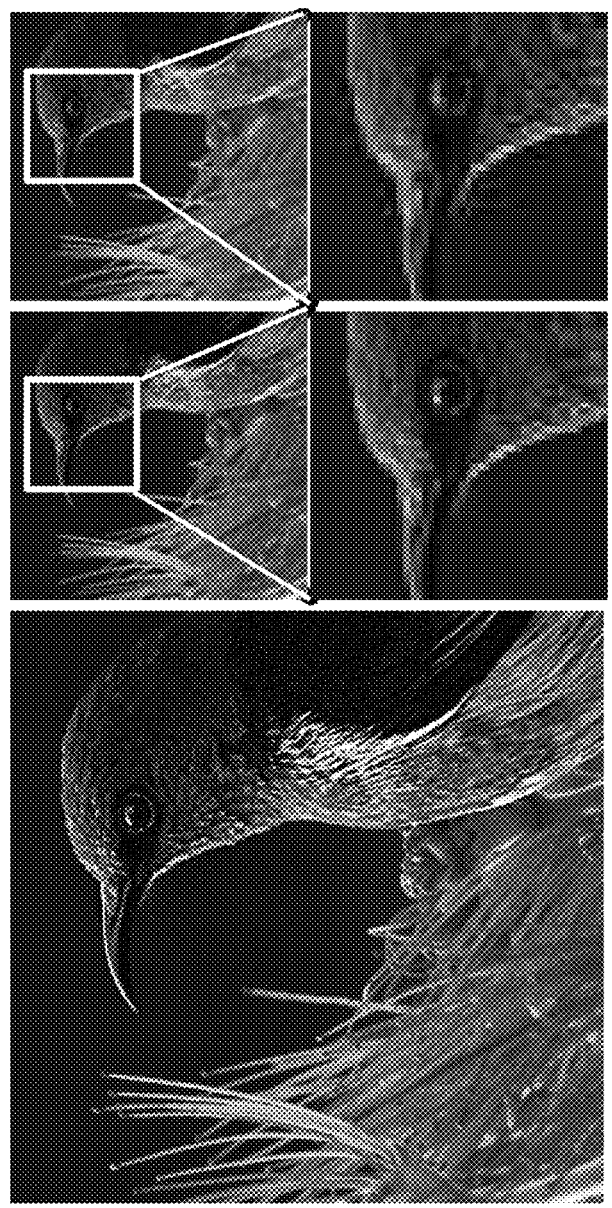
FIG. 1A is an image that depicts an example of high-res image data used in accordance with one or more embodiments of the invention.
FIG. 1B is an image that depicts an example of a low-res version of the high-res image data of FIG. 1A, used for training techniques, in accordance with one or more embodiments of the present invention, where the low-res version is four times downscaled version of the image data of FIG. 1A.
FIG. 1C is an image that depicts an example of four times downscaled low-res version of the image data of FIG. 1A, which is further compressed using the Joint Photographic Experts Group (JPEG) algorithm with the quality parameter of 50.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The field of machine learning is the one where a computer or a cluster of computers are running to perform a certain task based on sample data known as "training data" or "training data set." In supervised machine learning, a training dataset includes data signal pairs: a source data signal and a target data signal. Supervised machine learning algorithms process the training dataset to build a function that maps the source data signal to the target data signal and generalizes previously unseen input data signals. During the configuration of a supervised machine learning system, the user defines the type of function and a set of learnable parameters. Such a configuration of the function and the set of learnable parameters is typically termed as "model." In an embodiment, enough training data is provided to ensure a fit for the learnable parameters so that the model may generalize well to unseen input signals. During the training time, the machine learning algorithm finds the best set of learnable parameters using a loss function and an optimization algorithm.

Single image upscaling is a problem of machine learning art when there is a need to generate a target image given a single source image. The target image is a high-resolution (high-res) image, and the source image is a low-resolution (low-res) image. In light of modern knowledge, such a problem may be solved, for example, as a regression problem by defining the loss function as a Mean Square Error (MSE) between an output of the model and target images as follows:

$$MSE = \frac{1}{N}\sum_{i=1}^{N} (y_i - f(x_i, \theta))^2, \quad (E-1)$$

where x is a source low-res image, and y is a target high-res image, f is a mapping function, and θ is a set of learnable parameters.

Deep Convolutional Neural Networks (CNNs) may be trained to minimize MSE fast and accurately. As a result, the generated high-resolution image may be optimal for a Peak Signal-to-Noise Ratio (PSNR). However, such a generated high-resolution image may have low quality and look artificial. This problem is challenging because there are multiple equivalently probable solutions to the image upscaling, none of which is particularly attractive. For example, when upscaling a low-res image downscaled with a large downscale factor (four times or more), the original pattern of the low-res image in a high-res image is preserved. However, texture details are typically missed in the high-res image; for example, when upscaling a human face, instead of wrinkles, smooth skin will be visible in the generated image. The missing details may be reconstructed in a variety of different ways. When such ambiguity arises, the most probable solution is a technique of averaging over all possible textures in that part of the image resulting there in a blurry image and/or unnatural-looking image.

One may note, when reconstructing a high-resolution or super-resolution image from as little as a single low-res image, an important challenge is to preserve the naturalness of a scene of the low-res image in the high-res image, i.e., to preserve the original low-frequency information and add new high-frequency information that neither disturbs the original low-frequency information and nor conflicts therewith. For natural images (humans, animals, plants, etc.), the low-frequency information refers to the structure of the objects in the images, and high-frequency information refers to the details that are critical to more accurately represent the objects of the images. In machine learning, naturalness could be measured using the inception score. The inception score is calculated by first using a pre-trained Inception v3 model to predict the class probabilities for each generated image. It is also important to prevent artifacts from appearing on the reconstructed high-res image. The most common artifacts that occur when the image resolution is enhanced are artifacts associated with the deformation of high-frequency information of the enhanced-resolution image, e.g., the following artifacts: the blur effect, aliasing (step contouring), and the Gibbs effect (double contouring). Further, it is also desirable to be computing resource-efficient to ensure the computer processing times are minimal.

According to one approach, Super-Resolution Generative Adversarial Network (SRGAN) framework based on a Generative Adversarial Network (GAN) is used to generate a super-resolution image while mitigating the problem of unnaturalness and over the smoothness of the generated super-resolution image.

One approach for the application of the SRGAN techniques to resolve the above-mentioned challenges is a neural network trained to process low-res visual data to generate high-res visual data using two datasets: a training dataset and a reference dataset. This approach may modify the loss function and the training process in order to make two functions: a generator and a discriminator. The generator function produces a high-res image given a low-res source image. The discriminator is used to differentiate between the generated high-res images and genuine high-res images. The optimization process is repeated sequentially by training the generator and discriminator. The goal of the generator is to produce images that fool the discriminator while remaining consistent with the structure of the low-res source image. The training process stops when the system reaches the Nash equilibrium: when the generator and the discriminator cannot further improve (or may only improve negligibly/in the amount below threshold) the quality thereof.

As a result, the SRGAN approach generally provides the possibility of reconstructing a natural-looking super-resolved image from a degraded low-res image, at least in terms of the level of image details expected for a certain resolution. Nevertheless, the problems with the above approach lie in the complexity of selecting and joining training for the above-mentioned two functions. The major disadvantage is the joint configuration of the generator and discriminator. The generator competes with the discriminator on producing high-res images that the discriminator may not distinguish from the source ones. The training stops when both the generator and the discriminator reach a Nash equilibrium and cannot further improve (or may only improve negligibly/in the amount below threshold) their scores. In an embodiment, the way to find out that the configuration may reach stable Nash equilibriums is to train the model with different hyperparameters, which is very time-consuming. One more disadvantage is the noise sensitivity of the SRGAN approach. For instance, regular structures introduced by image compression, barely visible for a human eye, produce severe artifacts in the reconstructed high-res image. However, the SRGAN approach is not computing resource-efficient, and the training for improving the visual quality of high-res output images may have long runtime.

Techniques may include unsupervised machine learning that is used to learn an underlying deep image structure without user annotation. A particular case of the unsupervised machine learning techniques are auto-encoders, which tend to extract useful information on an image by sequential compression and decompression with loss of information. In an embodiment, the auto-encoder includes three layers: an encoder layer that extracts the summary of input data, a bottleneck layer that contains a latent space representation, i.e., the most important information, and a decoder layer that reconstructs the input data given the bottleneck information. The latent representation of input data is the compressed version of the input data, which keeps the most important features in order to reconstruct the input data with minimal error. The size of the latent space is defined by the user during the development of the auto-encoder. The meaningful information may be retrieved from the latent representation for various applications of the auto-encoder. Nevertheless, auto-encoders are trained with MSE loss, resulting in blurry output images.

Examples of autoencoders are Vector-Quantized Variational Auto-encoder (VQ-VAE) models for large-scale image generation using generative models: VQ-VAE model and VQ-VAE-2 model. Both of these auto-encoder approaches eliminate the above disadvantages of GANs. In the Vector-Quantized (VQ) bottleneck layer, each input vector is replaced by the most similar vector from a limited dictionary, also termed as a codebook. Training the VQ-VAEs with an MSE loss may not produce blurry output images because of the VQ bottleneck layer that forces the network to pick up one of the possible solutions. Despite that advantage, the VQ-VAE-type framework may not be applicable to the task of single image upscaling without serious modification. Particularly, the VQ-VAE-type framework may encode, decode, and generate VQ representations. Their application lies in the field of image generation and compression, allowing to build a sparse representation of an image. Thus, the input and output data of the VQ-VAE-type framework have the same size. Moreover, the disadvantage of the VQ-VAE-type approach is the sampling process using the Pixel Recurrent Neural Network (PixelRNN), which samples the quantized vectors sequentially, resulting in low performance caused by the complexity of the computational algorithm, which is an obstacle to its hardware implementation and application in solving problems of processing large-volume data in real-time.

In light of the aforementioned techniques described herein obviate the foregoing disadvantages inherent in the example auto-encoder solutions above. The techniques of the present invention improve the speed of training the single image upscaling algorithm and the visual quality of a low-res input image by generating its high-res version. The techniques may combine an unsupervised auto-encoder and supervised classifier (i.e., such a technique may be termed as a semi-supervised machine learning technique) to achieve the desired improvements.

As discussed in more detail below, the use of the disclosed machine learning algorithms provides a basis for a successful single image upscaling technique that significantly improves the visual quality of the generated high-res images and outperforms other algorithms.

DETAILED DESCRIPTION OF THE EMBODIMENTS

It is understood in the present patent application that super-resolution imaging is a technique that allows reconstructing a high resolution (high-res) image from a low resolution (low-res) image. The upscaling provides an increase in the total number of pixels by preserving the original pixels carrying low-frequency information and adding new ones. The new pixels include the relevant high-frequency information in order for the generated image to look natural and attractive. Nevertheless, in this disclosure, the term 'upscaling' is not limited to modeling global, low-frequency information for the generated high-res image, such as the shape and geometry of the objects presented in the scene, but also implies modeling local, high-frequency information, such as a texture. That is to say, the terms "super-resolution" and "upscaling" are of equal meaning in the present disclosure.

It is also understood in the present patent application that high-res image data of the training dataset may be referred to as high-res target image data, while low-res image data of the training dataset may be referred to a low-res source image data. High-res image data being generated by the high-res image generation techniques may be referred to as high-res output image data, while low-res image data used for generating a high-res version thereof may be referred to as low-res input image data.

It is further understood in the present patent application that image data may represent a whole image or a portion thereof. Even though the present techniques are explained in terms of upscaling a whole image, it will be apparent to one skilled in the art how to upscale a portion of the image by reading the description provided herein. Accordingly, the word 'image' as used herein also includes the corresponding portion thereof.

As described herein, the present disclosure provides a technique of training an algorithm to process low-res input image data to reconstruct a high-res version thereof. Such an algorithm may be implemented as a Neural Network (NN), particularly a Convolutional Neural Network (CNN). To train the algorithm, a training data set is used in the described training technique, which may also be termed as an example-based training techniques. The training dataset may include one or more examples of different resolution image data stored as pairs of low- and high-res image data of the same individual image representing a unique scene. The training techniques force the algorithm to learn the correlation between the low-res image data and the paired high-res image data from the training database of low- and high-res image pairs (commonly with a relative scale factor of at least two). The correlation is then applied to a low-res input image to reconstruct its most likely high-res version, i.e., a high-res output image. In an embodiment, the dataset for the training techniques includes a plurality of pairs of low- and high-res image data (e.g., units, or tens, or hundreds, or thousands of thousands of image pairs, etc.).

In an embodiment, a reasonable minimum limit for the number of image data pairs in the training dataset strongly depends on the configuration: number of parameters and the purpose of the image super-resolution techniques. It is, however obvious, the more pairs of low- and high-res images are included in the training dataset, the higher visual quality for the newly generated high-res version of the low-res input image is expected. Under the concept of visual quality, in addition to the upscaled size and clarity of the generated image, the visual quality may be measured by the generated image's naturalness and truthfulness.

According to the principles of the super-resolution algorithms, the missing high-frequency information for a high-res image being reconstructed from its low-res version is assumed to be indirectly available from example, low- and high-res image data pairs stored in the training database. A visual example of a low- and high-res image data pair from the training database, relating to an individual image representing a unique scene, is illustrated in the appended drawings. For example, FIG. 1A shows an example of original monochronic high-res image data, FIG. 1B shows a four-times downscaled low-res version (sized as 128×128) of the high-res image data of FIG. 1A, and FIG. 1C shows the image data of FIG. 1B, which are further compressed using the JPEG algorithm with the quality parameter of 50. FIGS. 1B and 1C also include 2.5× zoomed portions to illustrate further the obvious difference in the quality of the image data shown. The difference in visual quality between the image of FIG. 1A and its degraded versions of FIGS. 1B, 1C is so noticeable that the object of reconstructing a high-res target image from any of said low-res source versions is appreciated as a quite challenging problem.

One approach for solving this problem is based on using a bicubic interpolation technique to fill in "empty" pixels of an upscaled image being generated (reconstructed). An example image reconstructed from the low-res image of FIG. 1B using bicubic interpolation is shown in FIG. 2A. As can be seen from FIG. 2A, the bicubic interpolation generally preserves the original low-frequency information of the low-res source image in the generated high-res image. It is, however, clearly seen that this technique may not provide the generation of the proper high-frequency information, resulting in a very blurry image.

Another approach is based on the use of a Super-Resolution Generative Adversarial Network (SRGAN) technique. An upscaled version of the example low-res image of FIG. 1B, generated with the SRGAN technique, looks as illustrated in FIG. 2B. The SRGAN-based approach incorporates the use of a discriminator trained to distinguish natural and artificially generated images, and the generator is trained to generate images that are indistinguishable from natural images by the best discriminator. In effect, compared to the bicubic interpolation technique, the SRGANs allow reconstructing a much sharper image, i.e., the image including proper high-frequency information. However, as previously discussed, the SRGANs have a significant disadvantage with the compute-resource inefficiency/low performance, especially at the learning stage, which is a very time-consuming process.

Figure 2C:
FIG. 2C is an image that depicts an example image data generated from the low-res image data of FIG. 1B, where the image of FIG. 2C is a four times upscaled version of the image data of FIG. 1B, generated using the techniques of generating a high-res output image based on a low-res input image in accordance with an embodiment of the present invention.
Figure 2B:
FIG. 2B is an image that depicts an example image data generated from the low-res image data of FIG. 1B, where the image of FIG. 2B is a four times upscaled version of the image data of FIG. 1B, generated using the deep convolutional Super-Resolution Generative Adversarial Network (SRGAN) technique.
Figure 2A:
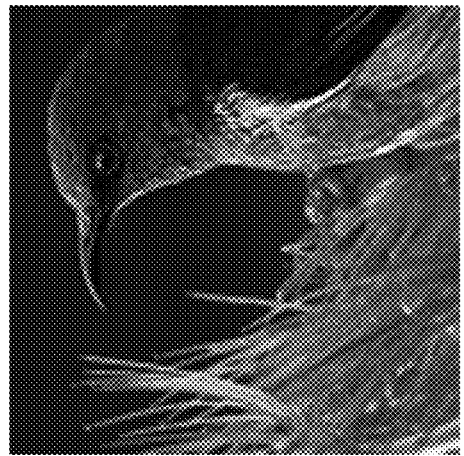
FIG. 2A is an image that depicts an example image data generated from the low-res image data of FIG. 1B, where the image of FIG. 2A is a four times upscaled version of the image data of FIG. 1B, generated using bi-cubic interpolation technique.

FIG. 2C shows an example upscaled version of the example low-res image of FIG. 1B, generated with a process using the algorithm trained in accordance with one or more embodiments of the present invention. As can be seen from FIG. 2C, the super-resolved image generated in accordance with the high-res image generation process looks natural and highly detailed, showing the details of the original high-res image with the substantially same visual quality. Particularly the visual quality of the image of FIG. 2C is perceivably similar to that of the image of FIG. 1A. At the same time, the present techniques have an advantage over the SRGAN technique in terms of performance, which will be discussed in more detail below.

In addition to downscaling, the poor visual quality of the source image may be caused by a compression operation. Specifically, the differences in the visual quality of high-res versions of the low-res source image, reconstructed using the above techniques, are even more visually obvious if the low-res source image is further compressed, for example, using the JPEG algorithm as shown in FIG. 1C. For the illustrative purpose, FIGS. 3A-3C show upscaled versions of the compressed image data of FIG. 1C, where FIG. 3A shows an example image reconstructed using bi-cubic interpolation technique, FIG. 3B shows an example image reconstructed using the SRGAN technique, and FIG. 3C shows an example image reconstructed using the high-res image generation techniques that use the algorithm trained in accordance with one or more embodiments of the present invention.

Figure 3A:
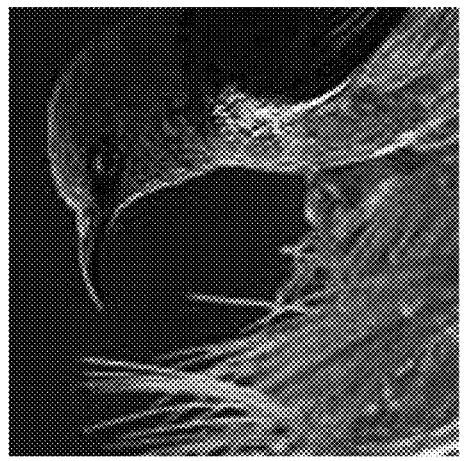
FIG. 3A is an image that depicts an example image data generated from the compressed low-res image data of FIG. 1C, where the image in FIG. 3A is a four times upscaled version of the compressed image data of FIG. 1C, generated using bi-cubic interpolation technique.
Figure 3B:
FIG. 3B is an image that depicts an example image data generated from the compressed low-res image data of FIG. 1C, where the image in FIG. 3B is a four times upscaled version of the compressed image data of FIG. 1C, generated using the SRGAN technique.
Figure 3C:
FIG. 3C is an image that depicts an example image data generated from the compressed low-res image data of FIG. 1C, where the image in FIG. 3C is a four times upscaled version of the compressed image data of FIG. 1C, generated using the techniques of generating a high-res output image based on a low-res input image in accordance with an embodiment of the present invention.

As seen from the illustrations in FIGS. 2A-3C, the visual quality of the images of FIGS. 3A-3B is significantly inferior to that of the corresponding images of FIGS. 2A-2B, while the visual quality of the image of FIG. 3C is substantially similar to that of the image of FIG. 2C. This fact may serve as a firm basis to conclude that additional compression of the low-res source image generates artifacts that may not be avoided or eliminated in any high-res images reconstructed from the compressed low-res source image using some super-resolution techniques, and on the contrary, are sometimes amplified by them. That is, such super-resolution techniques require further processing of the images generated, thereby making them free of the artifacts.

In this regard, the problem of reconstructing a high-res image from a single low-res image becomes even more complex and significant. To address at least this problem, techniques are described herein to train an algorithm for reconstructing high-res output image data even based on poor-quality input image data (e.g., compressed low-res image). In an embodiment, such techniques include a framework that combines the power of an unsupervised auto-encoder with a supervised classifier, thereby performing semi-supervised machine learning. Such a hybrid framework may be advantageously applied to train the algorithm to reconstruct a super-resolution output image from a single low-res input image without any additional external information.

The algorithm for generating super-resolution images, which is to be trained using the described training techniques, involves using two sub-algorithms: Vector-Quantized (VQ) auto-encoder and Probability Density Estimation (PDE) algorithm, in an embodiment.

Figure 4:
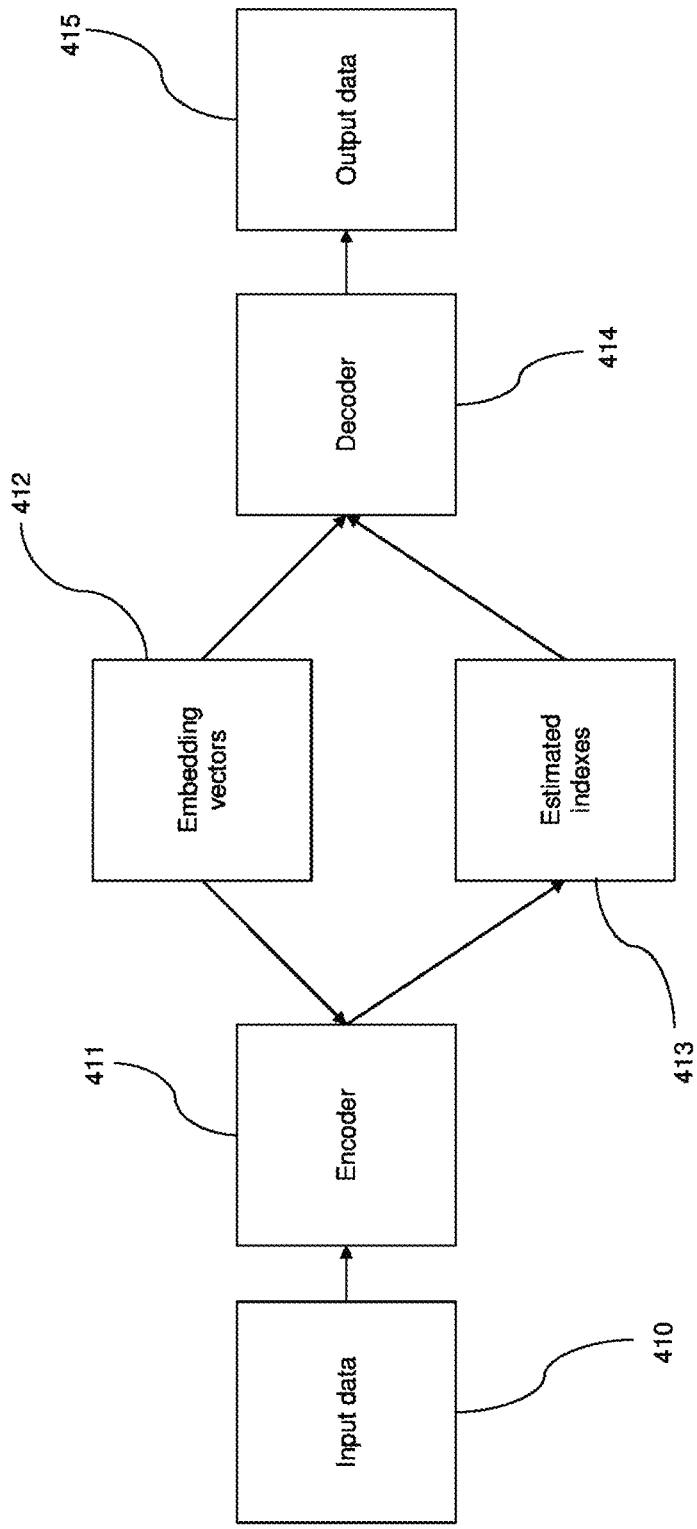
FIG. 4 is a block diagram that depicts a VQ-VAE framework, in an embodiment.

FIG. 4 is a schematic diagram of the architecture of VQ-VAE techniques, in an embodiment. VQ-VAE-2 may be obtained from VQ-VAE by incorporating several VQ-VAE into a hierarchical system.

The input data 410 is machine-readable. The step of obtaining the input data may include receiving image data stored on a machine-readable storage medium. The received input-data x is provided as input to the encoder 411, which is further denoted as $z_e(x)$. The encoder processes the input data into an intermediate representation. The encoder may be implemented as a Convolutional Neural Network (CNN) with or without residual blocks and non-linearities.

The intermediate representation is further processed by the Vector-Quantized (VQ) bottleneck, in an embodiment. The VQ bottleneck includes embedding vectors 412, further denoted as $e_j, j \in [0, N]$, where N is the capacity of the VQ-VAE and indexes 413. The embedding vectors and indexes (VQ bottleneck) may be implemented as a dictionary algorithm. The quantized vector retrieval may be implemented as a retrieval of the closest embedding. The VQ bottleneck contains a plurality of embedding vectors. The index of the retrieved vector from the dictionary may be computed using the following equation:

$$k(x) = \mathrm{argmin}_j \|z_e(x) - e_j\|_2 \quad \text{(E-2)},$$

where x—is an input data, $e_j$—is an embedding from the VQ dictionary.

Thus, the output of the VQ bottleneck may be estimated as follows:

$$vq(x) = e_{k(x)} \quad \text{(E-3)}$$

where k—is an index for the input data x retrieved with (E-2).

The decoder 414 further denoted as $z_d(vq(x))$, transforms the embedding vectors vq(x) back to the size of the input data 410, in an embodiment. The decoder may be implemented as a CNN and may also use additional inputs besides the quantized vectors. That is, the VQ auto-encoder encodes the input data into a VQ latent representation and decodes its back to reconstruct the information. The input data is processed by the encoder to create an intermediate representation $z_e(x)$. Indexes are obtained from $z_e(x)$ and embedding vectors using (E-2). The result of (E-3) is provided to the decoder, transforming $z_e(x)$ to closest embedding vectors $e_{k(x)}$. The result of the decoder $z_d(vq(x))$ is provided as the output data 415 of the VQ auto-encoder.

In an embodiment, VQ-VAE techniques encode the whole image into a VQ latent space. The information of an image may be divided into low and high-frequency details. To reproduce images with high-fidelity, the VQ-VAE techniques may require a large capacity N, which results in computational and memory costs. Image sampling is performed using prior knowledge stored in the PixelRNN. The PixelRNN generates indexes sequentially, which may require a forward pass for each new index. Because of at least these disadvantages, the VQ-VAE techniques may be unattractive for real-world applications.

Unlike the VQ-VAE techniques, the techniques described herein may perform Single Image Super-Resolution (SISR) tasks, in an embodiment. The SISR capable techniques differ in several aspects from the VQ-VAE and VQ-VAE-2 techniques. Firstly, instead of encoding the whole image, the encoding may be performed only for the high-frequency details that increases the speed of inference and reduces memory consumption. Secondly, in an embodiment, during the inference, the system may not have access to the reconstructed high-res image. Thus, the techniques use a Probability Density Estimation algorithm (PDE neural network) that predicts the most probable high-res indexes. In contrast to the PixelRNN, the PDE neural network predicts the high-res indexes for the whole image in a single forward pass. At least because of this and in conjunction with training and inference algorithms, the techniques described herein may be applicable for the SISR in real-world applications. Additionally, or alternatively, the SISR task may not require any variations in the output. VQ-VAE may be referred to herein as Vector-Quantized (VQ) auto-encoder or simply VQ-AE.

Figure 5:
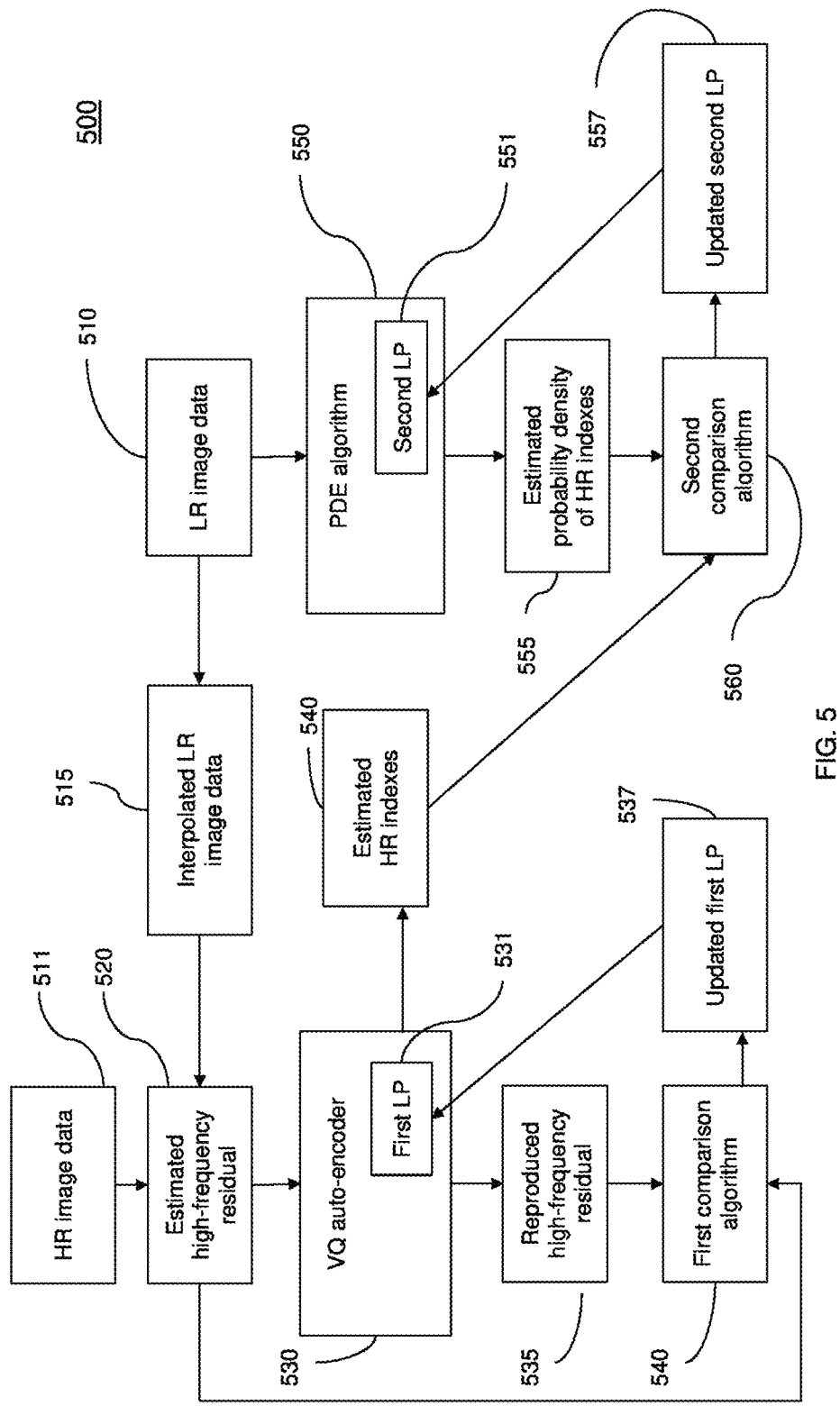
FIG. 5 is a block diagram that depicts a framework for a technique of training an algorithm in accordance with one or more embodiments of the present invention.

Referring to FIG. 5, a schematic diagram illustrates a framework of process 500 for training an algorithm in accordance with one or more embodiments of the present invention. The training process 500 starts by obtaining a set of training low-res and high-res image data similar to the ones explained with the references to FIGS. 1A-1C. Particularly, a training dataset used in the training process may use at least one image data pair. In the training dataset, each image data pair includes low-res source image data 510 and high-res target image data 511 relating to the same individual visual image representing a unique scene. In FIG. 5, "HR image data" stands for the high-res target image data 511, and "LR image data" stands for the low-res source image data 510. The step of obtaining the training dataset may include receiving image data stored on a non-transitory machine-readable storage medium or generating image data pairs of different resolutions based on high-res image data. For example, an image data pair of the training dataset may be created by downscaling the initial high-res image data and pairing the low-res image data thus obtained with the corresponding high-res initial image data. The high-res and low-res image data pair may be generated by a specific neural network configured to do so. In the training dataset, the image data pairs may have the same or different modalities.

The received low-res source image data 510 are interpolated to fit the size of the high-res target image data 511, producing interpolated low-res image data 515. The interpolated low-res image data 515 may be obtained using the nearest, bi-linear, bi-cubic, or another interpolation algorithm. Then, to obtain an estimated high-frequency residual 520 for the image data pair from the training dataset, the interpolated low-res image data 515 are subtracted from the paired high-res image data 511 of the image data pair.

The VQ auto-encoder 530 is trained to reproduce the estimated high-frequency residual 520. Particularly, the VQ auto-encoder 530 reproduces the estimated high-frequency residual 520 for the image data pair using a set 531 of learnable parameters of the VQ auto-encoder 530, resulting in a reproduced high-frequency residual 535. In FIG. 5, "First LP" stands for the set 531 of learnable parameters of the VQ auto-encoder 530.

The reproduction substep may be followed by a residual comparison procedure. With residual comparison algorithm 540, the reproduced high-frequency residual 535 is compared with the estimated high-frequency residual 520. The residual comparison algorithm 540 may be implemented, with the VQ auto-encoder 510, as Frobenius norm $L_{ae}$ of the difference of the input estimated high-frequency residual 520 and the reproduced high-frequency residual 535 using the following equation:

$$L_{ae} = \|x - z_d(vq(x))\|_2 \quad \text{(E-4)},$$

where x is input data, $z_d$ is the result of the decoder, and vq(x) is the output of the VQ bottleneck. The loss function may be implemented using other metrics, including Mean Absolute Error (MAE), or more sophisticated metrics like cosine-distance between x and $z_d(vq(x))$.

Although the argmin operation may not be differentiable, the process may still train the encoder, decoder, and embedding vectors by adding the VQ loss $L_{vq}$ as follows:

$$L_{vq} = \|sg[z_e(x)] - e\|_2 \quad \text{(E-5)},$$

where sg is the stop gradient operation, $z_e(x)$ is an intermediate representation created by the encoder based on the input data x, and e is an embedding from the VQ dictionary.

The goal of the VQ loss is to force the embedding vectors from the VQ bottleneck to be close to the output of the encoder. Also, commitment loss $L_c$ is calculated to help the encoder to produce feasible vectors close to the embedding vectors:

$$L_c = \|z_e(x) - sg[e]\|_2 \quad \text{(E-6)}$$

The overall loss function L may contain terms (E-4), (E-5), and (E-6):

$$L = L_{ae} + \alpha L_{vq} + \beta L_c$$

where $\alpha$, $\beta$—are normalization coefficients.

The training of the VQ auto-encoder 530 may include iterating until the difference between the reproduced high-frequency residual 535 and the estimated high-frequency residual 520 is determined to be less than a predefined threshold or until maximum iteration is reached. After each iteration, set 531 of learnable parameters of the VQ auto-encoder 530 are replaced with an updated set 537 of learnable parameters of the VQ auto-encoder to minimize the loss L from (E-7). The VQ auto-encoder training includes updating the set of learnable parameters of the VQ auto-encoder to optimize image data processing based on the comparison result obtained with the residual comparison algorithm 540. In FIG. 5, "First comparison algorithm" stands for the residual comparison algorithm 540.

Once the VQ auto-encoder 530 is trained, it may be used to estimate high-res indexes of the high-res image data of the image data pair from the training dataset. Particularly, the high-res indexes of the high-res image data of the image data pair from the training dataset may be estimated by applying the trained VQ auto-encoder 530 to the estimated high-frequency residual 520. In FIG. 5, "Estimated HR indexes" stands for the estimated high-res indexes 545.

The PDE algorithm 550 is trained to estimate a probability density of high-res indexes from (E-2), namely the high-res indexes of the high-res target image data 511 of the image data pair from the training dataset. These high-res indexes may be estimated by the PDE algorithm 550 based on the paired low-res source image data 510 from the training dataset. Particularly, the PDE algorithm 550 estimates the probability density of high-res indexes using set 551 of learnable parameters of the PDE algorithm, resulting in an estimated probability density 555 of high-res indexes. In FIG. 5, "Second LP" stands for the set 551 of learnable parameters of the PDE algorithm.

The PDE algorithm 550 may be implemented as a Convolutional Neural Network (CNN) with or without residual blocks and non-linearities. The estimated probability density 555 of high-res indexes may be stored as a tensor, having the same number of dimensions as the number of vectors in the VQ bottleneck.

The above estimation substep may be followed by an index comparison procedure. With an index comparison algorithm 560, the estimated probability density 555 of high-res indexes is compared with the high-res indexes 545 estimated by the VQ auto-encoder 530. The index comparison algorithm 560 may be implemented as an algorithm for computing a categorical cross-entropy using the following equation:

$$CE = -\sum_j^N t_j \log(z_{dp}(x_{lr})) \quad \text{(E-8)}$$

where $x_{lr}$ and $x_{hr}$—are the paired low-res and; 1 high-res image data from the training dataset, in is the interpolation operation, $t_j$—is equal to 1 when $j = k(x_{hr} - \text{in}(x_{lr}))$, and 0—otherwise, $z_{dp}$—is the PDE algorithm, k—is the estimated high-res index. In another embodiment, the difference between $z_{dp}(x_{lr})$ and high-res indexes are calculated based on the earthmover distance, also known as the 1st Wasserstein distance. In FIG. 5, "Second comparison algorithm" stands for the index comparison algorithm 560.

The PDE algorithm 550 is trained by minimizing CE from (E-8) with respect to its parameters using a version of the gradient descent algorithm, in an embodiment. The set of learnable parameters 551 of the PDE algorithm 550 may be updated using the error backpropagation algorithm.

Thus, the VQ auto-encoder 530 is trained to convert the estimated high-frequency residual 520 into a discrete set of indexes 545 and reconstruct the high-frequency residual from those indexes using the decoder of the VQ auto-encoder 530. The PDE algorithm 550 is trained to estimate the probability density distribution of high-res indexes using dictionary parameters given only the low-res source image data 510, in an embodiment. By replacing the encoder of the VQ auto-encoder with the PDE algorithm, a sampling algorithm may be used to generate a reconstructed high-frequency residual from low-res input image data.

The training of VQ auto-encoder 530 and PDE algorithm 550 may be performed in parallel or sequentially. In another embodiment, the above training procedures are performed sequentially, i.e., the VQ auto-encoder 530 is trained first, and when the training of the VQ auto-encoder 530 is completed, the training of the PDE algorithm 550 is started.

The training process 500 is described above as performing the entire series of steps using information relating to one image data pair of the training dataset. It is obvious that having trained on one image data pair, the process may automatically iterate the training based on information relating to another image data pair(s) from the training dataset if such image data pair(s) is/are available in the training dataset.

In one embodiment, the specified training process 500 may be performed in a sequence, where each step is performed using the information on all image data pairs from the training dataset. That is, the first step of process 500 is sequentially performed using information related to each image data pair being available in the training dataset. Then, the second step of the process 500 is performed using information related to said image data pairs, as well as all using the necessary results computed at the previous step(s). Following the same principle, then the third step is performed, etc. This approach optimizes the computational resources of the system that provides the implementation of the specified training process and thereby further accelerates the training process of the algorithm intended to reconstruct a high-res version of low-res image data.

Figure 6:
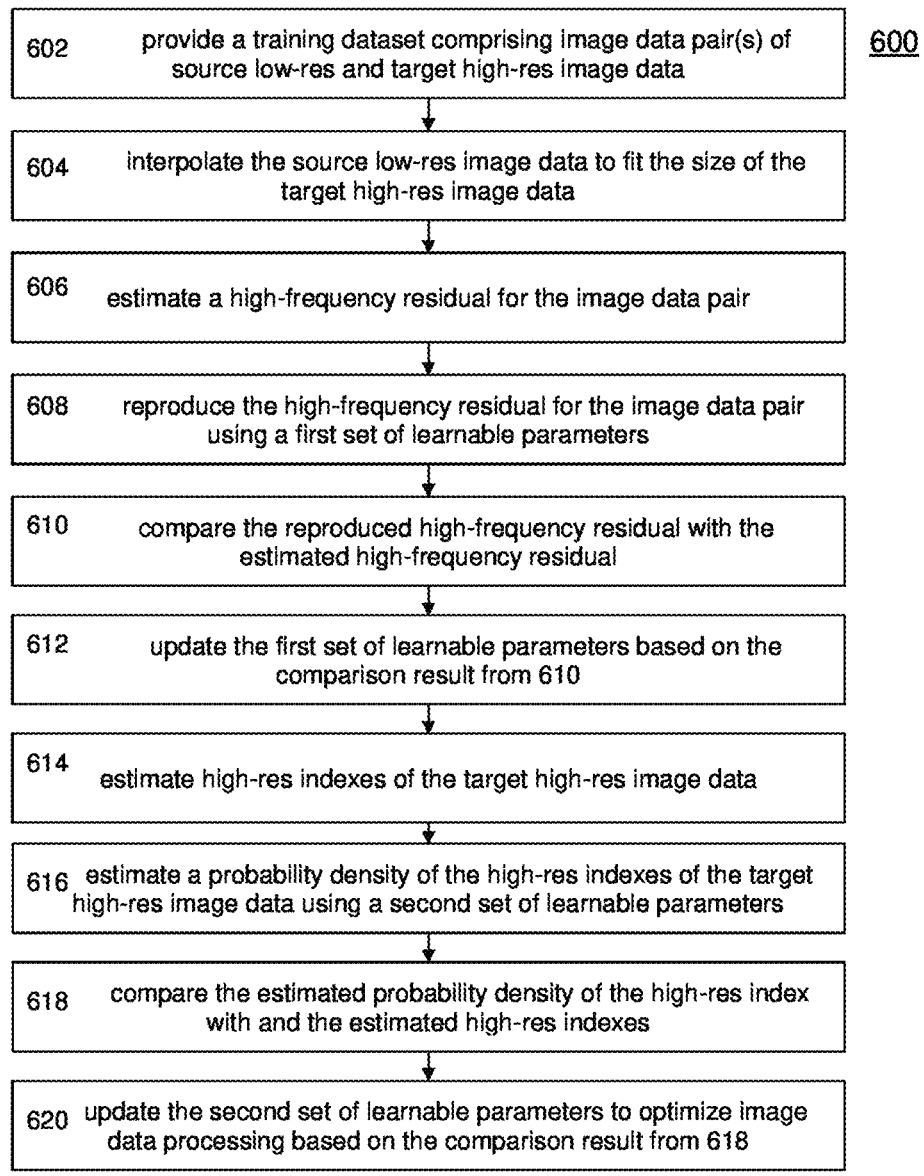
FIG. 6 is a block diagram that depicts an example process illustrating steps of the training technique of FIG. 5, in an embodiment.

Turning to FIG. 6, an example process 600 for training an algorithm to process low-res input image data to reconstruct a high-res output version of the low-res input image data using a set of training data is shown. Instructions for carrying out the process 600 and the rest of the processes included herein may be executed by a controller based on instructions stored in a memory of the controller or by a processor based on instructions stored in a machine-readable medium. Process 600 may include a sequence of steps 602-620 described below.

Process 600 begins at step 602, where a training dataset is obtained. The training dataset may include at least one image data pair, the image data pair of the training dataset including low-res source image data, and high-res target image data relating to the same individual image. Once the process determines that the training dataset is obtained, then the process progresses to step 604.

At step 604, the process interpolates the low-res source image data to fit the size of the high-res target image data. The interpolation may be performed, as explained with reference to FIG. 5. If the process determines that the interpolation of low-res source image data is completed, then the process progresses to step 606.

At step 606, the process estimates a high-frequency residual for the image data pair from the training dataset. The high-frequency residual may be estimated as the subtraction of the low-res source image data interpolated at 604 from the paired high-res target image data of the image data pair. If the process determines that the high-frequency residual is estimated, then the process progresses to step 608.

At step 608, the process reproduces the high-frequency residual for the image data pair from the training dataset, estimated at step 606. This reproduction may include reproducing, with a VQ auto-encoder, the estimated high-frequency residual for the image data pair using a set of learnable parameters of the VQ auto-encoder. If the VQ auto-encoder training cycle of the process 600 is performed for the first time (i.e., the case where the learnable parameters of the VQ auto-encoder have not been previously learned using training data), one aspect of the reproduction strategy may include generating an initial random set of learnable parameters. In this case, the reproduction includes reproducing, with the VQ auto-encoder, the estimated high-frequency residual for the image data pair using such a randomly generated initial set of learnable parameters of the VQ auto-encoder. These parameters may then be updated after processing further image data pair(s) from the training dataset. If the VQ auto-encoder training cycle of the process 600 is performed again (i.e., the case where the learnable parameters of the VQ auto-encoder have been updated during a previous VQ auto-encoder training cycle), the reproduction includes reproducing, with the VQ auto-encoder, the estimated high-frequency residual for the image data pair using the latest updated set of learnable parameters of the VQ auto-encoder. Once the process determines that the estimated high-frequency residual is reproduced by the VQ auto-encoder, then the process progresses to step 610.

At step 610, the process compares the high-frequency residual reproduced at 608 with the high-frequency residual estimated at step 606. The comparison may be performed with a residual comparison algorithm described above with reference to FIG. 5. Once the process determines that the comparison is completed, then the process progresses to step 612.

At step 612, the process may update the set of learnable parameters of the VQ auto-encoder to optimize image data processing based on the comparison result obtained at the previous step 610. Process 600 may iterate the steps 608-612 until the difference between the reproduced high-frequency residual at 608 and the estimated high-frequency residual at 606 is determined to be less than a predefined threshold or until the maximum number of iterations is reached.

The training cycle of the VQ auto-encoder includes the above steps 608-612.

Once the process determines that the training of the VQ auto-encoder is completed, then the process progresses to step 614.

At step 614, the process estimates the high-res indexes of the high-res target image data of the image data pair from the training dataset. The estimation may be performed by applying the trained VQ auto-encoder to the high-frequency residual estimated at step 606. If the process determines that the high-res indexes of the high-res target image data of the image data pair from the training dataset are estimated, then the process progresses to step 616.

At step 616, the process estimates a probability density of the high-res indexes of the high-res target image data of the image data pair from the training dataset, estimated at 614. The estimation may include estimating, with a PDE algorithm, the density probability of the high-res indexes based on the paired low-res source image data of the image data pair using a set of learnable parameters of the PDE algorithm. If the PDE algorithm training cycle of the process 600 is performed for the first time (i.e., the case where the learnable parameters of the PDE algorithm have not been previously learned using training data), one aspect of this estimation strategy may include generating an initial random set of learnable parameters. In this case, the estimation includes estimating, with the PDE algorithm, the probability density of the high-res indexes using such a randomly generated initial set of learnable parameters of the PDE algorithm. These parameters may then be updated after processing further image data pair(s) from the training dataset. If the PDE algorithm training cycle of the process 600 is performed again (i.e., the case where the learnable parameters of the PDE algorithm have been updated during a previous PDE algorithm training cycle), the estimation includes estimating, with the PDE algorithm, the probability density of the high-res indexes using the latest updated set of learnable parameters 557 of the PDE algorithm. Once the process determines that the probability density of the high-res indexes is estimated by the PDE algorithm, then the process progresses to step 618.

At step 618, the process compares the probability density of the high-res indexes estimated at 616 and the high-res indexes estimated at step 614. The comparison may be performed with an index comparison algorithm described above with reference to FIG. 5. Once the process determines that the comparison is completed, then the process progresses to step 620.

At step 620, the process may update the set of learnable parameters of the PDE algorithm to optimize image data processing based on comparing with the result obtained at the previous step 618. Then the process 600 may include iterating the steps 616-620 until the categorical cross-entropy (E-8) value is lesser (and/or equal) than a predefined threshold value, or until the maximum number of iterations is reached.

The training cycle of the PDE algorithm includes the above steps 616-620.

Once the process determines that the training of the PDE algorithm is completed, the process checks whether a further image data pair is available in the training dataset. In case the further image data pair is available in the training dataset, the process repeats steps 604-620 using the data of the further image data pair.

In one embodiment, the above process 600 is performed on data of one image data pair from the training dataset, after which the process may be repeated using data of another image data pair if such an image data pair exists in the training dataset. In another embodiment, the process may perform each step on the data of all image data pairs from the training dataset before proceeding to the next step. The process may be performed in a sequence of steps where, at step 604, the interpolation includes interpolating low-res image data of each image data pair from the training dataset, then, at step 606, the estimation includes estimating a high-frequency residual for each image data pair from the training dataset.

Figure 7:
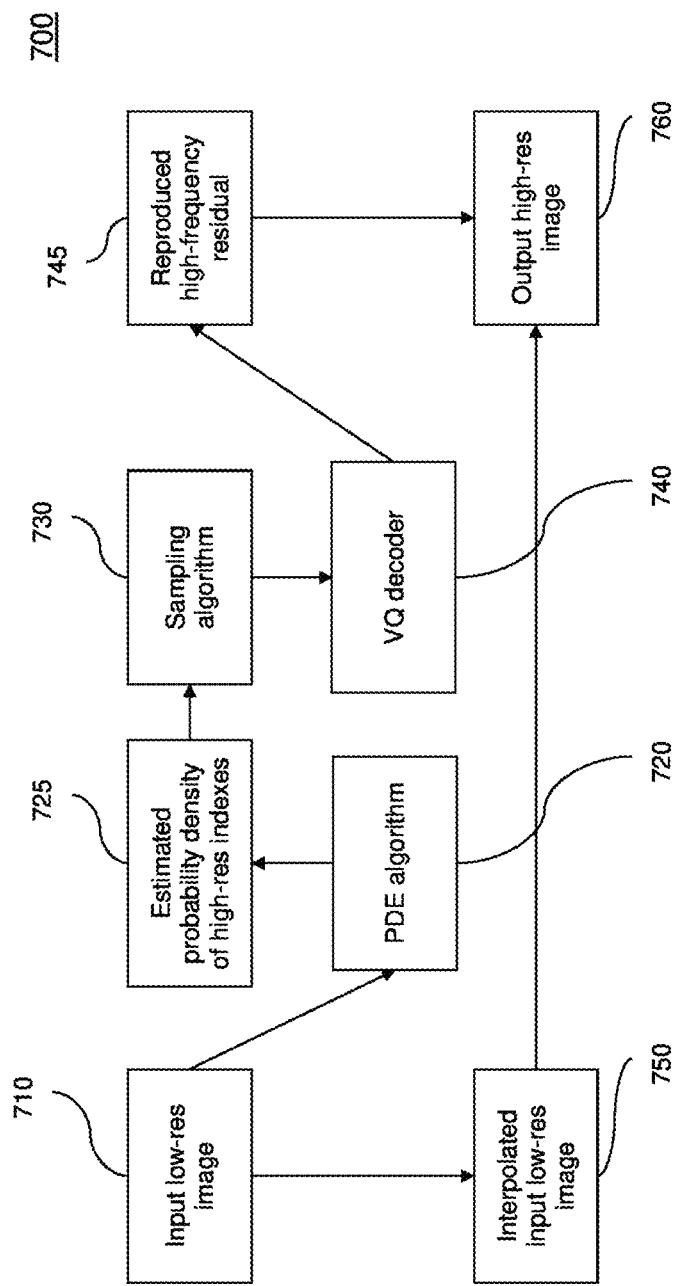
FIG. 7 is a block diagram that depicts a framework for a technique of generating a high-res output image based on a low-res input image in accordance with an embodiment of the present invention, the technique using the algorithm trained with the technique of FIG. 5.

Referring to FIG. 7, a schematic diagram illustrates a framework of a process 700 for generating a high-res output image based on a low-res input image in accordance with an embodiment of the present invention. Process 700 uses the trained algorithm described above with references to FIGS. 5-6.

Process 700 begins from receiving a low-res input image similar to the example one that is explained with references to FIGS. 1B-1C. The process reconstructs a high-res version of the low-res input image resulting in a high-res image similar to the example one that is explained with reference to FIG. 1A. To achieve the goal, the low-res input image 710 is provided as input to the trained PDE algorithm 720 to estimate a probability density of high-res indexes of a high-res output image being reconstructed. The estimation is performed by the PDE algorithm based on the low-res input image, using the PDE algorithm's set of learnable parameters.

The estimated probability density 725 of high-res indexes is provided as input to a sampling algorithm 730. The sampling may be implemented in different ways: sampling the most probable high-res indexes (maximum likelihood strategy) or sampling high-res indexes from a multinomial distribution. For example, the sampling may be determined as a multinomial distribution from which high-res indexes are sampled.

The Vector-Quantized (VQ) decoder 740 reconstructs a high-frequency residual for the high-res output image being reconstructed. The reconstruction may be performed by reproducing the high-frequency residual using the high-res indexes sampled from the estimated probability density 725. The VQ decoder 740 may use additional information, including low-res image data or features extracted from low-res image data used to train the algorithm to reconstruct a high-res version of low-res image data.

Further, the low-res input image is interpolated to fit the desired size of the high-res output image being reconstructed. The desired size of the high-res output image being reconstructed may be predefined and/or pre-configured as input to the upscaling framework. The desired size may be selected as a desired diagonal size and/or aspect ratio of the high-res output image.

Finally, to generate the high-res output image 760, the interpolated low-res input image 750 is summed with the reproduced high-frequency residual 745. The output of the algorithm is a high-res version of the low-res input image, having improved visual quality.

Figure 8:
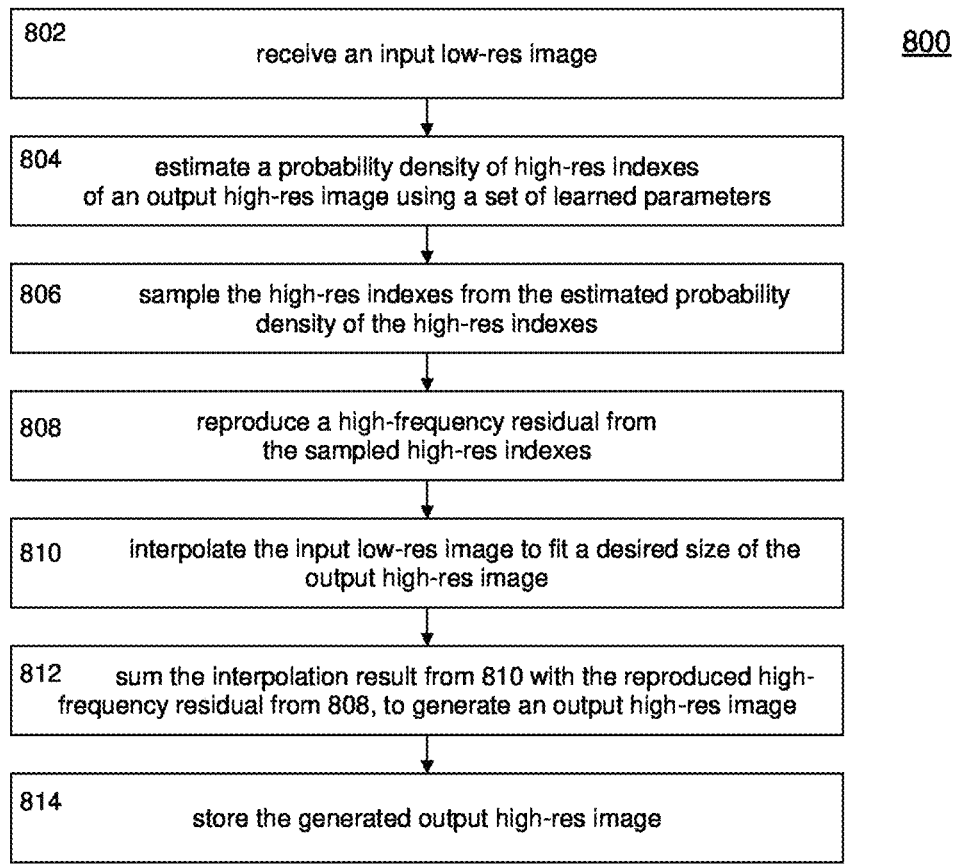
FIG. 8 is a block diagram that depicts an example process illustrating steps of the high-res image generation techniques of FIG. 7, in an embodiment.

Turning to FIG. 8, an example process 800 for generating a high-res output image based on a low-res input image using the algorithm trained to reconstruct a high-res version of low-res image data is shown. Particularly, process 800 may include a sequence of steps 802-814 described below.

Process 800 begins with step 802 of receiving a low-res input image being a degraded visual quality image. Such an input image does may not necessarily be a low-resolution image in terms of a certain number of pixels, but instead, it may simply be perceived perceptually by the user as a low visual quality image. Once the process determines that the input image is provided, then the process progresses to step 804.

At step 804, the process estimates, with a PDE algorithm, a probability density of high-res indexes of a high-res output image. The estimation is performed based on the low-res image using a set of learnable parameters of the PDE algorithm. Once the process determines that the probability density of high-res indexes is estimated, then the process progresses to step 806.

At step 806, the process samples, using a sampling algorithm, the high-res indexes from the estimated probability density of the high-res indexes. The sampling may be performed with the sampling algorithm described above with reference to FIG. 7. Once the process determines that the sampling is completed, then the process progresses to step 808.

At step 808, the process reproduces, with the VQ decoder, a high-frequency residual from the high-res indexes sampled at step 806. If the process determines that the reproduction of the high-res indexes is completed, then the process progresses to step 810.

At step 810, the process interpolates the low-res input image to fit the desired size of the high-res output image. If the process determines that the interpolated low-res input image data is obtained, then the process progresses to step 812.

At step 812, the process reconstructs a high-res version of the low-res input image. The reconstruction may be performed by summing the result of the interpolation performed at step 810 with the high-frequency residual reproduced at step 808. Once the process determines that the low-res output image is reconstructed, i.e., generated, then the process progresses to step 814.

At step 814, the process stores the generated high-res output image. For example, such a generated high-res output image may be stored in a memory functionally connected to the processor that executes 800.

It should be understood that the sequence of steps of the process 800 may be changed without departing from the scope and spirit of the embodiments of the invention. In contrast, the process will provide the same advantages and achieve the same technical effects. For example, the interpolated low-res input image data may be obtained before the high-frequency residual is reproduced.

One more embodiment of the present invention relates to a non-transitory computer-readable medium storing instructions executed by a processor. The execution of these instructions causes the processor to run the above algorithm that includes a decoder of a Vector-Quantized (VQ) auto-encoder, i.e., a Vector-Quantized (VQ) decoder, and Probability Density Estimation algorithm. Running the algorithm allows us to implement the high-res image generation techniques at least by performing the steps explained above with references to FIGS. 7-8.

One more embodiment of the present invention relates to a system for reconstructing a high-res image from a low-res image. The system includes at least one non-transitory computer-readable medium storing instructions and at least one processor. The processor is operably coupled to at least one said non-transitory computer-readable medium. The processor is arranged and configured to execute the instructions that, when executed, cause at least one processor to run the algorithm, including a Vector-Quantized (VQ) decoder and Probability Density Estimation (PDE) algorithm, to implement the high-res image generation techniques at least by performing the steps explained above with references to FIGS. 7-8.

With the systems and techniques described in the present disclosure, it is possible to reconstruct high-res images from low-res images having high downsampling factors using a Vector-Quantized latent representation, as explained above. Moreover, the provided disclosure results in at least improving the output performance compared to the VQ-VAE technique and in improving the speed of training procedure compared to SRGANs.

The techniques described herein and relating to the Single Image Super-Resolution (SISR) algorithm that significantly improves the performance of algorithm training procedure and visual quality of output images super-resolved by the trained algorithm may be applied to different fields of the art, design, and printing. It is important, however, to note the high-resolution details reconstructed by the described approach may not provide the true high-resolution details. Metric tasks are especially suitable for the techniques described herein.

Implementations of the various techniques described in the present disclosure may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers.

The steps described herein may be performed by one or more programmable processors executing instructions to perform functions by operating on input data and generating output. The steps also may be performed by, and an apparatus may be implemented as, special purpose logic circuitry, e.g., a Field Programmable Gate Array (FPGA) or an Application-Specific Integrated Circuit (ASIC).

Processors suitable for the execution of instructions include, by way of example, both general and special purpose microprocessors and any one or more processors of any kind of digital computer. Generally, a processor will receive instructions and data from a read-only memory or a random access memory, or both. Elements of a computer may include at least one processor for executing instructions and one or more memory devices for storing instructions and data. Generally, a computer also may include or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a Cathode Ray Tube (CRT) or Liquid Crystal Display (LCD) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a Graphical User Interface (GUI) or a Web browser through which a user may interact with an implementation, or any combination of such back-end, middleware, or front-end components. Components may be interconnected by any form or medium of digital data communication, e.g., a communication network. Examples of communication networks include a Local Area Network (LAN) and a Wide Area Network (WAN), e.g., the Internet.

The computing system may include clients and servers. A client and server are generally remote from each other and typically interact through a communication network. The relationship between client and server arises by virtue of computer programs running on the respective computers and having a client-server relationship with each other.

It should be understood that various information may be described with terms first, second, third, and the like in the present disclosure, but this information should not be limited to these terms. These terms are only adopted to distinguish the information of the same type. For example, without departing from the scope of the present disclosure, the first information may also be called second information. Similarly, the second information may also be called the first information. Depending on the context, the word "if" used here may be explained as "while" or "when" or "responding to a determination."

It should be understood that the invention is not limited to the exact structure described above and shown in the drawings, and without going beyond its scope, it may have various modifications and changes. Other embodiments of the invention may be readily understood by those skilled in the art based on the present description and the practical use of the invention disclosed herein. The present application is intended to cover all varieties, uses, or adaptations of the present invention resulting from its general principles and includes such embodiments of the invention, considering them to be in known or generally accepted practice in the art. The present description and embodiments should be considered only as an example, and the actual scope and essence of the present invention are set forth in the appended set of claims.

Additional Description of Embodiments

Techniques for reconstructing a high-resolution image from a single low-resolution image include receiving a low-resolution input image at an algorithm, including a Vector-Quantized (VQ) decoder and a Probability Density Estimation (PDE) algorithm. The PDE algorithm estimates a probability density of high-resolution indexes of a high-resolution output image based on the low-resolution input image using a set of learnable parameters. The high-resolution indexes are sampled, with a sampling algorithm, from the estimated probability density of the high-resolution indexes. A high-frequency residual is reproduced, with the VQ decoder, from the sampled high-resolution indexes. The high-resolution output image is generated by interpolating the low-resolution input image to fit the desired size of the high-resolution output image and summing the result of the interpolation with the reproduced high-frequency residual. The algorithm stores the generated high-resolution output image.

Techniques described herein achieve a technical effect, which includes improving the visual quality of a low-res input image by reconstructing a high-res version thereof using Vector-Quantized (VQ) latent representation. The further technical effect includes improving the speed of training the algorithm for reconstructing a high-res version of the low-res image data; the algorithm is based on using the VQ latent representation. One more further technical effect includes increasing the speed of the algorithm inference using the VQ latent representation. At least these specified technical effects are achieved by implementing one or more of the following aspects of the invention.

Unlike many approaches of image processing that use multiple slightly shifted images of one scene to produce a super-resolution image, the techniques described herein may use only a single image to generate the high-res image thereof, solving the single image super-resolution (SISR) problem using prior information obtained during training, in an embodiment.

Techniques describe training an algorithm to process low resolution (low-res) input image data to reconstruct a high resolution (high-res) output version of the low-res input image data using a training data set. In an embodiment, the techniques include the steps of: (a) obtaining a training dataset containing at least one image data pair, the techniques further describe data pair of the training dataset including low-res and high-res image data relating to the same individual image represented by the pair; (b) estimating a high-frequency residual for the image data pair from the training dataset as the subtraction of the interpolated low-res image data from the paired high-res image data of the image data pair; (c) training a Vector-Quantized (VQ) auto-encoder to reproduce the estimated high-frequency residual for the image data pair from the training dataset by reproducing, with the VQ auto-encoder, the estimated high-frequency residual for the image data pair using a set of learnable parameters of the VQ auto-encoder, and comparing, with a residual comparison algorithm, the reproduced and estimated high-frequency residuals, wherein the training of (c) includes updating the set of learnable parameters of the VQ auto-encoder to optimize image data processing based on the comparison result of (c); (d) estimating high-res indexes of the high-res image data of the image data pair from the training dataset by applying the trained VQ auto-encoder to the estimated high-frequency residual; and (e) training a Probability Density Estimation (PDE) algorithm to estimate a probability density of the high-res indexes of the high-res image data of the image data pair from the training dataset by estimating, with the PDE algorithm, said density probability of the high-res indexes based on the paired low-res image data of the image data pair using a set of learnable parameters of the PDE algorithm, and comparing the estimated probability density of the high-res indexes and the estimated high-res indexes, wherein the training of (e) includes updating the set of learnable parameters of the PDE algorithm to optimize image data processing based on the comparison result of (e).

The vector-quantization process at step e) converts the input signal into a set of indexes of a codebook, in an embodiment. The codebook is a lookup table that is used for replacing a given index with an embedding vector. The vector-quantization process may be configured to minimize the difference between the input signal and the output of the vector-quantization.

The above training techniques may also be implemented using the following features, alone or in any combination with each other, according to one or more embodiments. The low-res image data of the training dataset may represent a low-res visual image. The high-res image data of the training dataset may represent a high-res visual image. The image data pairs from the training dataset may have the same or different modalities: scenes of individual images, which said image data pairs of the training dataset might relate to the same or different categories of scenes. The algorithm for training may be implemented as a Neural Network (NN), particularly as an Artificial Neural Network (ANN), more particularly as a Convolutional Neural Network (CNN). The VQ auto-encoder and the PDE algorithm may be each implemented as a CNN.

Each of the CNNs, particularly the VQ auto-encoder and PDE algorithm, may include one or more convolutional layers, may contain one or more non-linearity activation functions, may include or exclude normalization and pruning layers. The layers of said CNNs may be connected sequentially or in different ways. The VQ auto-encoder and the PDE algorithm may be parametrized with weights and biases. Both the VQ auto-encoder and PDE algorithm may be trained using a version of the gradient descent algorithm. The gradients for both VQ-encoder and PDE algorithm sets of learnable parameters may be estimated using the back-propagation algorithm.

The substep of comparing the reproduced high-frequency residual with the estimated high-frequency residual may include determining the difference between the reproduced high-frequency residual and the estimated high-frequency residual. The substep of updating the set of learnable parameters of the VQ auto-encoder may be performed based on the determined difference between the reproduced high-frequency residual and the estimated high-frequency residual. The training of the VQ auto-encoder may iterate until the difference value between the reproduced high-frequency residual, and the estimated high-frequency residual is determined to be less than a predefined threshold or until maximum iteration is reached. As the difference between the reproduced high-frequency residual and the estimated high-frequency residual Mean Square Error (MSE) may be used. The VQ auto-encoder may include a bottleneck layer of the VQ auto-encoder, containing embedding vectors and estimated indexes, which may be implemented as a dictionary algorithm. The VQ auto-encoder may include a decoder that may or may not include additional input signals to increase the quality of upscaling the low-res image data and/or solve additional problems like de-noising, compression artifacts removal, or other image filtering tasks.

A probability density estimation of high-res indexes is a function whose value at any given sample may be interpreted as providing a relative likelihood that the value of the high-res index would equal that sample. The substep of comparing the estimated probability density of the high-res indexes with the estimated high-res indexes may include determining the difference between the estimated probability density of the high-res indexes and the estimated high-res indexes. The substep of updating the set of learnable parameters of the PDE algorithm may be performed based on the determined difference between the estimated probability density of the high-res indexes and the estimated high-res indexes. The training of the PDE algorithm may iterate until the difference value is lesser than (and/or equal to) a predefined threshold value or until maximum iteration is reached. The difference between the estimated probability density of the high-res indexes and the estimated high-res indexes may be computed using categorical-cross entropy. Such a difference may be used to determine if further training is necessary.

Techniques include generating an output high-res image based on a low-res input image using an algorithm trained to reconstruct a high-res version of low-res image data. In an embodiment, the techniques include the steps of receiving a low-res input image; estimating, with a probability density estimation (PDE) algorithm, a probability density of high-res indexes of a high-res output image based on the low-res image using a set of learnable parameters; sampling, with a sampling algorithm, the high-res indexes from the estimated probability density of the high-res indexes; reproducing, with a decoder of a Vector-Quantized (VQ) auto-encoder, a high-frequency residual from the sampled high-res indexes; generating the high-res output image by interpolating the low-res input image to fit a desired size of the high-res output image and summing the result of the interpolation with the reproduced high-frequency residual; and storing the generated high-res output image.

In an embodiment, the above step of sampling is implemented as a maximum likelihood strategy where high-res indexes with maximum probability scores are selected.

In another embodiment, the above step of sampling is implemented as sampling from a multinomial distribution. The output of the PDE algorithm is used as a multinomial distribution.

The VQ auto-encoder is trained to encode the high-frequency residual into a set of high-res indexes. In an embodiment, once trained, the VQ auto-encoder is capable of reproducing the high-frequency residual using its built-in decoder based on the high-res indexes only. During the algorithm inference, the encoder of the VQ auto-encoder is not used and is replaced with the PDE algorithm, which is trained to estimate the high-res indexes probability density distribution based on the low-res input image data, in an embodiment.

In yet further aspect, described is a non-transitory computer-readable medium storing instructions that, when executed by a processor, cause the processor to run an algorithm including a Vector-Quantized (VQ) decoder and Probability Density Estimation (PDE) algorithm, to implement the techniques of generating a high-res output image based on a low-res input image in accordance with one of the aspects of the present invention.

In yet further aspect, described is a system for reconstructing a high-res image from a low-res image, the system comprising at least one non-transitory computer-readable medium storing instructions; and at least one processor that is operably coupled to the at least one non-transitory computer-readable medium and that is arranged and configured to execute the instructions that, when executed, cause the at least one processor to run an algorithm including a Vector-Quantized (VQ) decoder and Probability Density Estimation (PDE) algorithm, to implement the techniques of generating a high-res output image based on a low-res input image in accordance with one of the aspects of the present invention.

(1) An example process of training an algorithm to process low resolution (low-res) input image data to reconstruct a high resolution (high-res) output version of the low-res input image data using a set of training data, the example process comprising the steps of:
  (a) providing a training dataset comprised of at least one image data pair, the image data pair of the training dataset including low-res and high-res image data relating to same individual image;
  (b) estimating a high-frequency residual for the image data pair from the training dataset;
  (c) training a Vector-Quantized (VQ) auto-encoder to reproduce the estimated high-frequency residual for the image data pair from the training dataset by reproducing, with the VQ auto-encoder, the estimated high-frequency residual for the image data pair using the first set of learnable parameters, and comparing, with a first comparison algorithm, the reproduced and estimated high-frequency residuals, wherein the training of (c) includes updating the first set of learnable parameters to optimize image data processing based on the comparison result of (c);
  (d) estimating high-res indexes of the high-res image data of the image data pair from the training dataset by applying the trained VQ auto-encoder to the estimated high-frequency residual; and
  (e) training a Probability Density Estimation (PDE) algorithm to estimate a probability density of the high-res indexes of the high-res image data of the image data pair from the training dataset by estimating, with the PDE algorithm, said density probability of the high-res indexes based on the paired low-res image data of the image data pair using the second set of learnable parameters, and comparing the estimated probability density of the high-res indexes and the estimated high-res indexes, wherein the training of (e) includes updating the second set of learnable parameters to optimize image data processing based on the comparison result of (e).

(2) The example process described in paragraph (1), wherein the low-res image data is a low-res visual image, and wherein the high-res image data is a high-res visual image.

(3) The example process described in paragraph (1), wherein at least one of the VQ auto-encoder and the PDE algorithm is a convolutional neural network.

(4) The example process described in paragraph (3), wherein each of the convolutional neural networks includes at least one of the following: one or more convolutional layers, one or more non-linearity activation functions, normalization, and pruning layers.

(5) The example process described in paragraph (4), wherein the layers of the convolutional neural networks are sequential.

(6) The example process described in paragraph (1), wherein the estimation of the high-frequency residual for the image data pair from the training dataset is the subtraction of the interpolated low-res image data from the paired high-res image data of the image data pair.

(7) The example process described in paragraph (1), wherein at least one of the VQ auto-encoder and the PDE algorithm is parametrized with weights and biases.

(8) The example process described in paragraph (1), wherein the VQ auto-encoder and the PDE algorithm are trained using a gradient descent algorithm.

(9) The example process described in paragraph (8), wherein gradients for the first and second sets of learnable parameters are estimated using a backpropagation algorithm.

(10) The example process described in paragraph (1), wherein the comparison at (c) includes determining the difference between the reproduced high-frequency residual and the estimated high-frequency residual.

(11) The example process described in paragraph (10), wherein the update of the first set of learnable parameters of the VQ auto-encoder is based on the determined difference between the reproduced high-frequency residual and the estimated high-frequency residual.

(12) The example process described in paragraphs (10) or (11), wherein the training of the VQ auto-encoder at (c) iterates until the difference value between the reproduced high-frequency residual and the estimated high-frequency residual is determined to be less than a predefined threshold, or until maximum iteration is reached.

(13) The example process described in any of paragraphs (10)-(12), wherein the difference between the reproduced high-frequency residual and the estimated high-frequency residual is computed as Mean Square Error (MSE).

(14) The example process described in paragraph (1), wherein the VQ auto-encoder includes a decoder receiving additional input signals to solve additional problems like de-noising or compression artifacts removal.

(15) The example process described in paragraph (1), wherein the comparison at (e) includes determining the difference between the estimated probability density of the high-res indexes and the estimated high-res indexes.

(16) The example process described in paragraph (15), wherein the update of the second set of learnable parameters of the PDE algorithm is based on the determined difference between the estimated probability density of the high-res indexes and the estimated high-res indexes.

(17) The example process described in paragraphs (15) or (16), wherein the training of the PDE algorithm at (e) iterates until the difference value between the estimated probability density of the high-res indexes and the estimated high-res indexes is lesser than a predefined threshold value, or until maximum iteration is reached.

(18) The example process of any of paragraphs (10)-(12), wherein the difference between the estimated probability density of the high-res indexes and the estimated high-res indexes is computed using categorical-cross entropy.

(19) An example process of generating a high-res output image based on a low-res input image using an algorithm including a Vector-Quantized (VQ) decoder and Probability Density Estimation (PDE) algorithm, trained to reconstruct a high-res version of low-res image data, the example process comprising the steps of:
  receiving a low-res input image;
  estimating, with the PDE algorithm, a probability density of high-res indexes of a high-res output image based on the low-res image using a set of learnable parameters of the PDE algorithm;
  sampling, with a sampling algorithm, the high-res indexes from the estimated probability density of the high-res indexes;
  reproducing, with the VQ decoder, a high-frequency residual from the sampled high-res indexes;
  generating the high-res output image by interpolating the low-res input image to fit a desired size of the high-res output image and summing the result of the interpolation with the reproduced high-frequency residual; and
  storing the generated high-res output image.

(20) The example process described in paragraph (19), wherein the sampling includes maximum likelihood strategy to sample the most probable high-res indexes.

(21) The example process described in paragraph (19), wherein the sampling includes sampling high-res indexes from a multinomial distribution.

(22) The example process described in paragraph (19), wherein the desired size of the high-res output image being generated is manually selected by the user and represents a desired diagonal size and/or aspect ratio of the high-res output image.

(23) A non-transitory computer-readable medium storing instructions that, when executed by a processor, cause the processor to run an algorithm including a Vector-Quantized (VQ) decoder and Probability Density Estimation (PDE) algorithm, trained to reconstruct a high-res version of low-res image data, to implement the example process steps of paragraphs (19)-(22).

(27) A system for reconstructing a high-res image from a low-res image, comprising: at least one non-transitory computer-readable medium storing instructions; and at least one processor operably coupled to the at least one non-transitory computer-readable medium and that is arranged and configured to execute the instructions that, when executed, cause the at least one processor to run an algorithm including a Vector-Quantized (VQ) decoder and Probability Density Estimation (PDE) algorithm, trained to reconstruct a high-res version of low-res image data, to the example process steps of paragraphs (19)-(22).

What is claimed is:

1. A computer-implemented method comprising:
  receiving input image data of a low-resolution image, having an input size, to generate output image data for a high-resolution image having an output size, the output size being greater than the input size;
  interpolating the input image data to match the output size, thereby generating interpolated image data for an interpolated image of the output size;
  determining residual image data based on the input image data, the determining the residual image data based on the input image data comprising:
    providing the input image data to a first convolutional neural network (CNN) trained to estimate probability density of high-resolution indexes for the input image data to generate estimated probability density of intermediate indexes;
    based on the estimated probability density of intermediate indexes, selecting a plurality of intermediate indexes;
    providing the plurality of intermediate indexes as input to a second convolutional neural network to generate the residual image data;
  combining the interpolated image data with the residual image data to generate the output image data for the high-resolution image of the output size.

2. The method of claim 1, wherein determining the residual image data based on the input image data further comprises:
  providing the input image data to one or more models to generate the residual image data.

3. The method of claim 1, wherein determining the residual image data based on the input image data further comprises:
  providing the input image data to one or more models to generate a plurality of intermediate indexes;
  decoding the plurality of intermediate indexes to generate the residual image data.

4. The method of claim 1, wherein determining the residual image data based on the input image data further comprises:
  providing the input image data to a probability density estimation model to generate the estimated probability density of intermediate indexes;
  based on the estimated probability density of intermediate indexes, selecting a plurality of intermediate indexes;
  decoding the plurality of intermediate indexes to generate the residual image data.

5. A computer-implemented method comprising:
  selecting at least one image data pair from a training dataset, the at least one image data pair of the training dataset including low-resolution image data and high-resolution image data relating to a same particular image, the high-resolution image data having a desired output size;

interpolating the low-resolution image data to the desired output size thereby generating interpolated low-resolution image data of the desired output size;

based on the high-resolution image data and the interpolated low-resolution image data, generating high-frequency residual image data of the particular image;

based on the high-frequency residual image data of the particular image, generating index data that is an intermediate representation of the high-frequency residual image data;

based on the low-resolution image data and an untrained set of learning parameters, generating a set of probabilities for the intermediate representation of the high-frequency residual image data;

based on comparing the index data for the intermediate representation of the high-frequency residual image data with the set of probabilities for the intermediate representation of the high-frequency residual image data, updating the untrained set of learning parameters thereby generating a trained set of learning parameters.

6. The method of claim 5, further comprises:
subtracting the interpolated low-resolution image data from the high-resolution image data, thereby generating the high-frequency residual image data of the particular image.

7. The method of claim 5, further comprising:
determining one or more difference values between the index data for the intermediate representation of the high-frequency residual image data and the set of probabilities for the intermediate representation of the high-frequency residual image data;
determining that the one or more difference values are greater than or equal to corresponding one or more predefined threshold values, or a maximum number iteration is not reached;
based on determining that the one or more difference values are greater than or equal to the corresponding one or more predefined threshold values, or the maximum number iteration is not reached, selecting a next image data pair from the training dataset.

8. The method of claim 7, wherein the one or more difference values are calculated using a categorical-cross entropy.

9. The method of claim 5, wherein the untrained set of learning parameters is a second untrained set of learning parameters, the trained set of learning parameters is a second trained set of learning parameters, the high-frequency residual image data of the image is a derived high-frequency residual image data, and the method further comprising:
using a first untrained set of learning parameters, generating a reproduced high-frequency residual image data of the particular image;
comparing the reproduced high-frequency residual image data of the particular image with the derived high-frequency residual image data;
based on comparing the reproduced high-frequency residual image data of the image with the derived high-frequency residual image data, updating the first untrained set of learning parameters thereby generating a first trained set of learning parameters;
using the first trained set of learning parameters, generating the index data that is the intermediate representation of the high-frequency residual image data.

10. The method of claim 5, wherein the untrained set of learning parameters is a second untrained set of learning parameters, the trained set of learning parameters is a second trained set of learning parameters and the method further comprises:
training, by a Vector-Quantized (VQ) auto-encoder, a first untrained set of learning parameters to a first trained set of learning parameters;
using the first trained set of learning parameters, generating, by the VQ auto-encoder, the index data that is the intermediate representation of the high-frequency residual image data of the image.

11. The method of claim 5, further comprising:
training, by a probability density estimation (PDE) logic, the untrained set of learning parameters to the trained set of learning parameters;
using the trained set of learning parameters, generating, by the PDE logic, an estimated probability density of intermediate indexes.

12. One or more non-transitory computer-readable media storing a set of instructions, wherein the set of instructions includes instructions, which, when executed by one or more hardware processors, cause:
receiving input image data of a low-resolution image, having an input size, to generate output image data for a high-resolution image having an output size, the output size being greater than the input size;
interpolating the input image data to match the output size, thereby generating interpolated image data for an interpolated image of the output size;
determining residual image data based on the input image data, the determining the residual image data based on the input image data comprising:
providing the input image data to a first convolutional neural network (CNN) trained to estimate probability density of high-resolution indexes for the input image data to generate estimated probability density of intermediate indexes;
based on the estimated probability density of intermediate indexes, selecting a plurality of intermediate indexes;
providing the plurality of intermediate indexes as input to a second convolutional neural network to generate the residual image data;
combining the interpolated image data with the residual image data to generate the output image data for the high-resolution image of the output size.

13. The one or more non-transitory computer-readable media of claim 12, wherein the set of instructions further includes instructions, which when executed by said one or more hardware processors, cause:
providing the input image data to a probability density estimation model to generate the estimated probability density of intermediate indexes;
based on the estimated probability density of intermediate indexes, selecting a plurality of intermediate indexes;
decoding the plurality of intermediate indexes to generate the residual image data.

14. A system comprising one or more processors and one or more storage media storing one or more computer programs for execution by the one or more processors, the one or more computer programs configured to perform a method comprising:
receiving input image data of a low-resolution image, having an input size, to generate output image data for a high-resolution image having an output size, the output size being greater than the input size;

interpolating the input image data to match the output size, thereby generating interpolated image data for an interpolated image of the output size;
determining residual image data based on the input image data, the determining the residual image data based on the input image data comprising:
providing the input image data to a first convolutional neural network (CNN) trained to estimate probability density of high-resolution indexes for the input image data to generate estimated probability density of intermediate indexes;
based on the estimated probability density of intermediate indexes, selecting a plurality of intermediate indexes;
providing the plurality of intermediate indexes as input to a second convolutional neural network to generate the residual image data;
combining the interpolated image data with the residual image data to generate the output image data for the high-resolution image of the output size.

15. The system of claim 14, wherein determining the residual image data based on the input image data further comprises:
providing the input image data to one or more models to generate the residual image data.

16. The system of claim 14, wherein determining the residual image data based on the input image data further comprises:
providing the input image data to one or more models to generate a plurality of intermediate indexes;
decoding the plurality of intermediate indexes to generate the residual image data.

17. The system of claim 14, wherein determining the residual image data based on the input image data further comprises:
providing the input image data to a probability density estimation model to generate the estimated probability density of intermediate indexes;
based on the estimated probability density of intermediate indexes, selecting a plurality of intermediate indexes;
decoding the plurality of intermediate indexes to generate the residual image data.

18. A system comprising one or more processors and one or more storage media storing one or more computer programs for execution by the one or more processors, the one or more computer programs configured to perform a method comprising:
selecting at least one image data pair from a training dataset, the at least one image data pair of the training dataset including low-resolution image data and high-resolution image data relating to a same particular image, the high-resolution image data having a desired output size;
interpolating the low-resolution image data to the desired output size, thereby generating interpolated low-resolution image data of the desired output size;
based on the high-resolution image data and the interpolated low-resolution image data, generating high-frequency residual image data of the particular image;
based on the high-frequency residual image data of the particular image, generating index data that is an intermediate representation of the high-frequency residual image data;
based on the low-resolution image data and an untrained set of learning parameters, generating a set of probabilities for the intermediate representation of the high-frequency residual image data
based on comparing the index data for the intermediate representation of the high-frequency residual image data with the set of probabilities for the intermediate representation of the high-frequency residual image data, updating the untrained set of learning parameters, thereby generating a trained set of learning parameters.

19. The system of claim 18, wherein the method further comprises:
subtracting the interpolated low-resolution image data from the high-resolution image data, thereby generating the high-frequency residual image data of the image.

20. The system of claim 18, wherein the method further comprises:
determining one or more difference values between the index data for the intermediate representation of the high-frequency residual image data and the set of probabilities for the intermediate representation of the high-frequency residual image data;
determining that the one or more difference values are greater than or equal to corresponding one or more predefined threshold values, or a maximum number iteration is not reached;
based on determining that the one or more difference values are greater than or equal to the corresponding one or more predefined threshold values, or the maximum number iteration is not reached, selecting a next image data pair from the training dataset.

* * * * *